US012576747B2

(12) United States Patent　　(10) Patent No.: US 12,576,747 B2

Araujo Xavier et al.　　(45) Date of Patent: Mar. 17, 2026

(54) ELECTRIFIED VEHICLE CONTROL USING TRACTION BATTERY ARRAY-BASED MULTI-CELL STATE ESTIMATION

(71) Applicant: Ford Global Technologies, LLC, Dearborn, MI (US)

(72) Inventors: Marcelo Araujo Xavier, Belleville, MI (US); Justin T. Hughes, Allen Park, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 477 days.

(21) Appl. No.: 17/736,276

(22) Filed: May 4, 2022

(65) Prior Publication Data

US 2023/0356623 A1　Nov. 9, 2023

(51) Int. Cl.
　　*B60L 58/12*　　(2019.01)
　　*B60L 50/61*　　(2019.01)
　　*B60L 58/16*　　(2019.01)
　　*B60W 10/04*　　(2006.01)
　　*B60W 10/24*　　(2006.01)
　　*H01M 10/44*　　(2006.01)
(52) U.S. Cl.
　　CPC ............... *B60L 58/12* (2019.02); *B60L 50/61* (2019.02); *B60L 58/16* (2019.02); *B60W 10/04* (2013.01); *B60W 10/24* (2013.01); *H01M 10/441* (2013.01)
(58) Field of Classification Search
　　CPC .......... B60L 58/12; B60L 50/61; B60L 58/16; B60W 10/24; H01M 10/441
　　See application file for complete search history.

(56) References Cited

U.S. PATENT DOCUMENTS

| 9,718,455 | B2 | 8/2017 | Yu et al. | |
| 2017/0358832 | A1* | 12/2017 | Sun | H01M 50/505 |
| 2020/0067324 | A1* | 2/2020 | Zou | H01M 10/0525 |
| 2020/0194849 | A1* | 6/2020 | Hwang | H01M 10/46 |
| 2021/0208203 | A1* | 7/2021 | Guo | H01M 10/441 |
| 2022/0024438 | A1* | 1/2022 | Vuylsteke | B60W 10/06 |

(Continued)

FOREIGN PATENT DOCUMENTS

| CA | 2588334 | C | 9/2011 | |
| WO | WO-2022003368 | A2 * | 1/2022 | B60L 3/0007 |

OTHER PUBLICATIONS

Kim et al., "Hybrid Bar-Delta Filter-Based Health Monitoring for Multicell Lithium-Ion Batteries using an Internal Short-Circuit Cell Model", 2021, IEEE 12th International Symposium on Power Electronics for Distributed Generation Systems (Year: 2021).*

(Continued)

*Primary Examiner* — Ricky Go

(74) *Attorney, Agent, or Firm* — David B. Kelley; Brooks Kushman P.C.

(57)　　　ABSTRACT

A system includes a traction battery and a controller. The traction battery includes first and second arrays of battery cells. The controller is programmed to implement first and second filters, such as first and second bar-delta filters, configured to respectively generate output indicative of a state-of-charge (SOC) of the first and second arrays from models of the first and second arrays. The controller is further programmed to charge and/or discharge the traction battery according to power limits defined by the SOC of the first and second arrays.

10 Claims, 3 Drawing Sheets

(56) References Cited

U.S. PATENT DOCUMENTS

| | | | | |
|---|---|---|---|---|
| 2022/0069605 A1* | 3/2022 | Trela | ...................... | H02J 7/0025 |
| 2022/0314835 A1* | 10/2022 | Altaf | ........................ | B60L 58/13 |
| 2023/0137625 A1* | 5/2023 | Sankavaram | ........ | G01R 31/367 |
| | | | | 701/29.2 |
| 2023/0307925 A1* | 9/2023 | Ishii | ...................... | H02J 7/0016 |

OTHER PUBLICATIONS

Plett, Gregoy L., Efficient Battery Pack State Estimation using Bar-Delta Filtering, University of Colorado at Colorado Springs and Consultant to Compact Power Inc., Stavanger, Norway, May 13-16, 2009.

Fengchun Sun, Rui Xiong, A novel dual-scale cell state-of-charge estimation approach for series-connected battery pack used in electric vehicles, Journal of Power Sources, 2014.

Yuejiu Zheng, et al., Cell state-of-charge inconsistency estimation for LiFePO4 battery pack in hybrid electric vehicles using mean-difference model, Applied Energy 111 (2013) 571-580.

Haifeng Dai, et al., Online Cell SOC estimation of Li-ion battery packs using a dual time-scale Kalman filtering for EV application, Applied Energy 95 (2012) 227-237.

* cited by examiner

ELECTRIFIED VEHICLE CONTROL USING TRACTION BATTERY ARRAY-BASED MULTI-CELL STATE ESTIMATION

TECHNICAL FIELD

The present invention relates to controlling a traction battery of an electrified vehicle according to a state of the traction battery estimated on a battery cell level.

BACKGROUND

An electrified vehicle includes a traction battery for providing power to propel the vehicle. The traction battery is comprised of battery cells typically arranged in arrays. For serviceability, techniques exist to remove a specific array and replace that array with a new array. In this way, one or more arrays can be replaced instead of replacing the entire traction battery. Consequently, the traction battery may become comprised of differently aged arrays of battery cells.

SUMMARY

An object includes a control strategy for a traction battery in which the control strategy considers age differences between arrays of battery cells of the traction battery in detecting a state (e.g., state-of-charge (SOC), state-of-health (SOH), and/or state-of-power (SOP)) of the traction battery.

A system having a traction battery and a controller is provided. The traction battery includes first and second arrays of battery cells. The controller is programmed to implement first and second bar-delta filters configured to respectively generate output indicative of a SOC of the first and second arrays from models of the first and second arrays. The controller is further programmed to charge and/or discharge the traction battery according to power limits defined by the SOC of the first and second arrays.

The first and second bar-delta filters may be further configured to respectively generate output indicative of a SOH of the first and second arrays from models of the first and second arrays. The power limits may be further defined by the SOH of the first and second arrays.

The first and second bar-delta filters may be further configured to respectively generate output indicative of a SOP of the first and second arrays from models of the first and second arrays. The power limits may be further defined by the SOP of the first and second arrays.

The traction battery may further include a third array of battery cells. In this case, the controller is further programmed to implement a third bar-delta filter configured to generate output indicative of a SOC of the third array from a model of the third array and charge and/or discharge the traction battery according to power limits defined by the SOC of the first, second, and third arrays.

The output indicative of the SOC of the first array may be based in part on a comparison of a measured average voltage of the battery cells of the first array and an estimated average voltage of the battery cells from the model of the first array.

The output indicative of the SOC of the first array may be further based in part on a comparison of a measured voltage of one of the battery cells of the first array and an estimated voltage of the one of the battery cells from the model of the first array.

Responsive to a first difference between the measured average voltage of the battery cells of the first array and the estimated average voltage of the battery cells from the model of the first array, parameters of a bar filter portion of the first bar-delta filter may be updated according to the first difference. Responsive to a second difference between the measured voltage of one of the battery cells of the first array and the estimated voltage of the one of the battery cells from the model of the first array, parameters of a delta filter portion of the first bar-delta filter may be updated according to the second difference. The estimated voltage of the one of the battery cells from the model of the first array depends on output of the bar filter portion of the first bar-delta filter.

A method is also provided. The method includes generating, via a first bar-delta filter, output indicative of a SOC of a first array of battery cells of a traction battery from a model of the first array and generating, via a second bar-delta filter, output indicative of a SOC of a second array of battery cells of the traction battery from a model of the second array. The method further includes charging and/or discharging the traction battery according to power limits defined by the SOC of the first and second arrays.

An automotive control system including a controller is also provided. The controller is programmed to charge and/or discharge a traction battery according to power limits defined by a SOC of each of first and second arrays of battery cells of the traction battery and to implement first and second filters configured to respectively generate output indicative of the SOC of the first and second arrays from models of the first and second arrays. One of the filters may be a bar-delta filter or both of the filters may be bar-delta filters.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
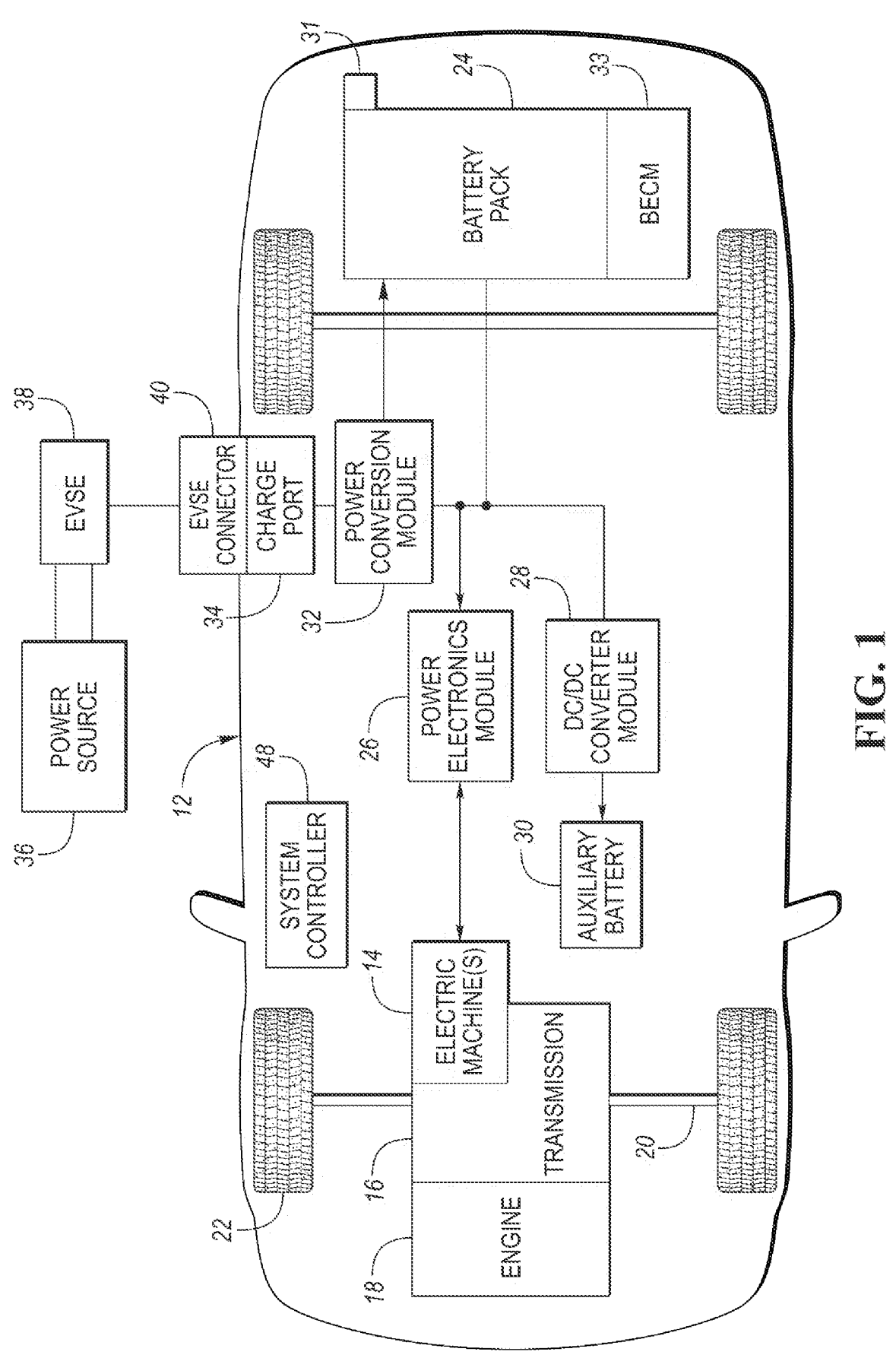
FIG. 1 illustrates a block diagram of an electrified vehicle having a traction battery.

Referring now to FIG. 1, a block diagram of an exemplary electrified vehicle 12 is shown. In this example, electrified vehicle 12 is a plug-in hybrid electric vehicle (PHEV) having an engine 18 and a traction battery (or "battery pack") 24. In other embodiments, electrified vehicle 12 is a non-plug-in hybrid electric vehicle. In other embodiments, electrified vehicle 12 is battery electric vehicle (BEV). In a BEV configuration, electrified vehicle 12 does not include engine 18.

Electrified vehicle 12 includes one or more electric machines 14 mechanically connected to a transmission 16. Electric machine 14 is capable of operating as a motor and as a generator. Transmission 16 is mechanically connected to engine 18 and to a drive shaft 20 mechanically connected to wheels 22. Electric machine 14 can provide propulsion capability while engine 18 is turned on or off. Electric machine 14 acting as a generator can recover energy that may normally be lost as heat in a friction braking system. Electric machine 14 may reduce vehicle emissions by allowing engine 18 to operate at more efficient speeds and allowing electrified vehicle 12 to be operated in electric mode with engine 18 off under certain conditions.

Traction battery 24 stores electrical energy that can be used by electric machine 14 for propelling electrified vehicle 12. Traction battery 24 typically provides a high-voltage (HV) direct current (DC) output. Traction battery 24 is electrically connected to a power electronics module 26 which is electrically connected to electric machine 14. Power electronics module 26 provides the ability to bi-directionally transfer energy between traction battery 24 and the electric machine. For example, traction battery 24 may provide a DC voltage while electric machine 14 may require a three-phase alternating current (AC) current to function. Power electronics module 26 may convert the DC voltage to a three-phase AC current to operate electric machine 14. In a regenerative mode, power electronics module 26 may convert three-phase AC current from electric machine 14 acting as a generator to DC voltage compatible with traction battery 24.

In addition to providing energy for propulsion, traction battery 24 may provide energy for other vehicle electrical systems. A typical vehicle electrical system may include a DC/DC converter module 28 that converts the high voltage DC output of traction battery 24 to a low voltage DC supply compatible with other vehicle components. Other high-voltage loads, such as compressors and electric heaters, may be connected directly to the high-voltage supply without the use of DC/DC converter module 28. Typically, the low-voltage systems are electrically connected to an auxiliary battery 30 (e.g., a 12 V DC battery).

Traction battery 24 is rechargeable by an external power source 36 (e.g., the grid). Electric vehicle supply equipment (EVSE) 38 is connected to external power source 36. EVSE 38 provides circuitry and controls to control and manage the transfer of energy between external power source 36 and electrified vehicle 12. External power source 36 may provide DC or AC electric power to EVSE 38. EVSE 38 may have a charge connector 40 for plugging into a charge port 34 of electrified vehicle 12. Charge port 34 may be any type of port configured to transfer power from EVSE 38 to electrified vehicle 12. A power conversion module 32 of electrified vehicle 12 may condition power supplied from EVSE 38 to provide the proper voltage and current levels to traction battery 24. Power conversion module 32 may interface with EVSE 38 to coordinate the delivery of power to traction battery 24. Alternatively, various components described as being electrically connected may transfer power using a wireless inductive coupling.

The various components described above may have one or more associated controllers to control and monitor the operation of the components. The controllers can be microprocessor-based devices. The controllers may communicate via a serial bus (e.g., Controller Area Network (CAN)) or via discrete conductors.

For example, a system controller 48 ("vehicle controller") is present to coordinate the operation of the various components. Controller 48 includes electronics, software, or both, to perform the necessary control functions for operating electrified vehicle 12. In embodiments, controller 48 is a combination vehicle system controller and powertrain control module (VSC/PCM). Although controller 48 is shown as a single device, controller 48 may include multiple controllers in the form of multiple hardware devices, or multiple software controllers with one or more hardware devices. In this regard, a reference to a "controller" herein may refer to one or more controllers.

A battery energy control module (BECM) 33 is in communication with traction battery 24. BECM 33 may act as a controller for traction battery 24 and monitor and control the performance of the traction battery. BECM 33 may include an electronic monitoring system that manages temperature and charge state of battery cells of traction battery 24. Traction battery 24 may have a temperature sensor 31 such as a thermistor or other temperature gauge. Temperature sensor 31 may be in communication with BECM 33 to provide temperature data regarding traction battery 24.

Traction battery 24 is comprised of a plurality of arrays of battery cells. Each array includes a group of the battery cells. The group of battery cells of an array are physically connected together to thereby form the array. As a result, the arrays comprise battery cells physically connected and adjacent to one another. As an example, traction battery 24 may be a "3P96S" battery pack comprised of "96" logical cells connected in series ("S") in which each logical cell is comprised of "3" individual battery cells connected in parallel ("P"). In this example, traction battery 24 has ten arrays in total with eight of the arrays each containing ten logical cells and two of the arrays each containing eight logical cells.

Figure 2:
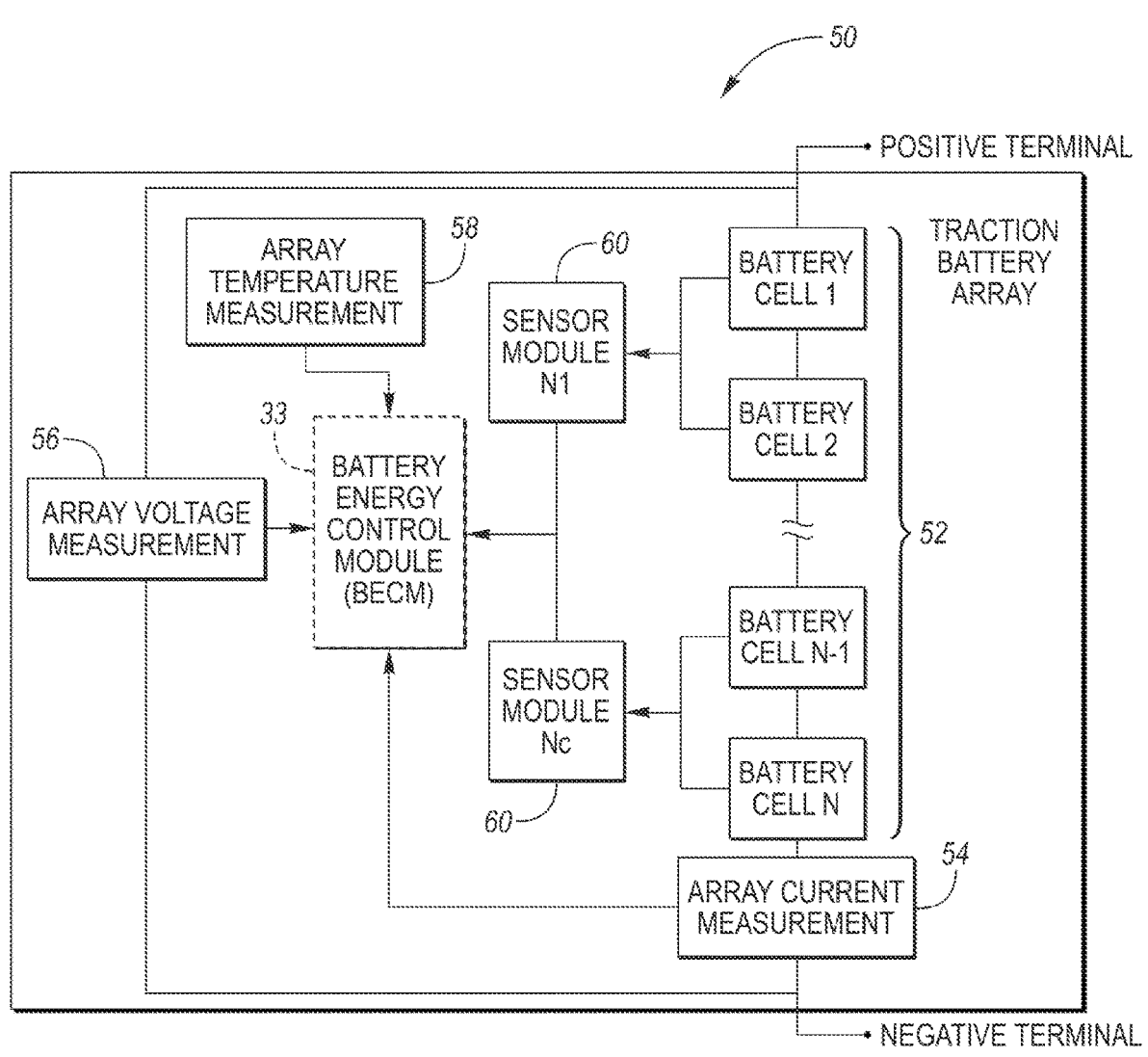
FIG. 2 illustrates a block diagram of a traction battery array arrangement in which the battery cells of an array of the traction battery are monitored and controlled by a controller.

Referring now to FIG. 2, with continual reference to FIG. 1, a block diagram of a traction battery array arrangement 50 in which the battery cells of the array are monitored and controlled by a controller is shown. As an example, the controller is BECM 33. For ease of illustration, the battery cells of the array are shown in traction battery array arrangement 50 in a simple series configuration of N battery cells 52.

Traction battery array arrangement 50 is an arrangement for a corresponding one of the battery cell arrays of traction battery 24. Thus, in the exemplary case in which traction battery 24 has ten arrays of battery cells, ten traction battery array arrangements are provided. BECM 33 is operable for monitoring and controlling the battery cells for each of the ten traction battery array arrangements.

In traction battery cell arrangement 50, BECM 33 is operable to monitor array level characteristics of the array of battery cells 52 such as array current 54, array voltage 56, and array temperature 58. In addition to the array level characteristics, BECM 33 is operable to measure and monitor battery cell level characteristics of battery cells 52 of the array. For example, terminal voltage, current, and temperature of each battery cell 52 may be measured. BECM 33 may use a sensor module 60 to measure the characteristics of battery cells 52. Depending on the capabilities, sensor module 60 may measure the characteristics of one or multiple of battery cells 52. BECM 33 may utilize up to Nc sensor modules 60 to measure the characteristics of all battery cells 52. Each sensor module 60 may transfer the measurements to BECM 33 for further processing and coordination. Sensor module 60 functionality may be incorporated internally to BECM 33.

Figures 3, 4:
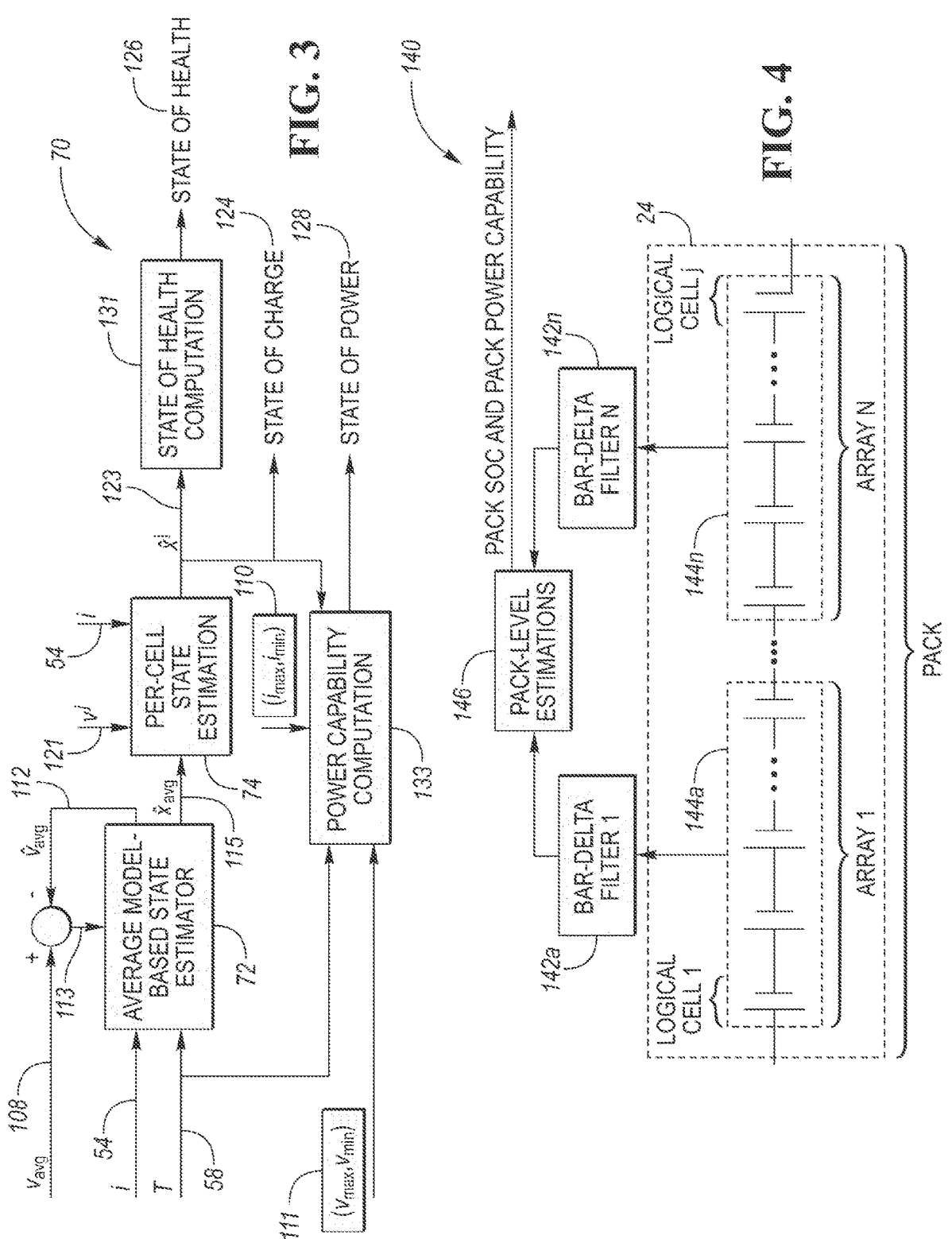
FIG. 3 illustrates a block diagram of operation of the controller for modeling an array of the traction battery, the operation involving a bar-delta filter implemented by the controller.
FIG. 4 illustrates a block diagram of a plurality of bar-delta filters implemented by the controller for modeling corresponding arrays of the traction battery, the controller being operable to detect a state (e.g., state-of-charge (SOC), state-of-health (SOH), and/or state-of-power (SOP)) of the traction battery from the models of the arrays whereby the controller considers age differences between the arrays in controlling the traction battery.

Referring now to FIG. 3, with continual reference to FIGS. 1 and 2, a block diagram 70 of operation of the controller for modeling an array of traction battery 24 is shown. Again, as an example, the controller is BECM 33. The operation depicted in block diagram 70 is for modeling a corresponding one of the battery cell arrays of traction battery 24. Thus, in the exemplary case in which traction battery 24 has ten arrays, the operation depicted in block diagram 70 is reproduced ten times. In this case, each of the ten operations respectively corresponds to one of the ten arrays.

In modeling an array of traction battery 24, the operation of block diagram 70 involves a bar-delta filter implemented by BECM 33. The bar-delta filter implements (i) a bar filter portion which provides an average cell estimation routine 72 (labeled "Average Model-Based State Estimator" in FIG. 3) and (ii) a delta filter portion which provides a target cell estimation routine 74 (labeled "Per-Cell State Estimation" in FIG. 3).

In general, the bar-delta filter (i.e., a dual-time scale filter) is employed by BECM 33 to estimate the equivalent circuit model states of an average battery cell ("cell") of an array through the bar (average) filter portion, which is handled by average cell estimation routine 72, while the deviations of each individual cell of the array from the average cell are estimated by the delta (deviation) filter portion, which is handled by target cell estimation routine 74. The states are then used to provide information regarding state-of-charge (SOC), state-of-health (SOH), and state-of-power (SOP) of the array. In this way, the array is modeled using the bar-delta filter.

More particularly, average cell estimation routine 72, which may be partially comprised of a Kalman filter algorithm, is configured to receive a value of array current 54 and a value of array temperature 58. Average cell estimation routine 72 uses at least array current value 54 to calculate an average cell voltage value ($\hat{v}_{avg}$) 112 and an average cell state vector ($\hat{x}_{avg}$) 115. To calculate average cell voltage value 112 and average cell state vector 115, average cell estimation routine 72 employs a bar filter function.

Average cell voltage value 112 may be subtracted from a measured average cell voltage value ($v_{avg}$) an 108 resulting in estimation error 113 which is provided to average cell estimation routine 72. As such, the estimated voltage may function as a feedback loop with the provided average voltage and average cell estimation routine 72.

Average cell state vector 115 may be comprised of a plurality of capacitor voltage components, an array SOC component, an array internal resistance component, and a bias current component.

Target cell estimation routine 74 is configured to receive array current value 54, average cell state vector 115, and a voltage value ($v^j$) 121 of each cell of the array, where "j" is the j$^{th}$ cell of the array. Target cell estimation routine 74 is configured to calculate a cell state vector ($\hat{x}^j$) 123 for each cell of the array based on array current value 54, average cell state vector 115, and cell voltage values 121 for the corresponding cells.

Each cell state vector 123 includes a cell SOC component, a cell internal resistance component, and a cell capacity component for the corresponding cell to which the cell state vector pertains. As such, cell state vector 123 for cell j includes a SOC component for cell j, an internal resistance component for cell j, and a capacity component for cell j.

BECM 33 may generate a SOC value 124 of the array according to the cell SOC component of cell state vector 123 for each of the cells of the array.

BECM 33 may implement a SOH computation routine 131. SOH computation routine 131 is configured to generate a SOH value 126 of the array based at least in part on cell state vectors 123. SOH value 126 may include a further evaluation of cells within the array. For example, SOH value 126 may include a differential value of individual cell minimum and maximum voltage and current values. Additionally, or alternately, SOH value 126 may include an overall array health evaluation. As such, SOH 126 may have access to array historical values.

BECM 33 may implement a SOP computation routine 133. SOP computation routine 133 is configured to generate a SOP value 128 indicative of amount of power the array can dispense or receive based at least in part on cell state vectors 123. In making the determination, SOP computation routine 133 may further rely on a current range vector 110 and a voltage range vector 111. Current range vector 110 may comprise the maximum current value of one of the cells of the array and the minimum current value of one of the cells of the array. Similarly, voltage range vector 111 may comprise the maximum voltage value of one of the cells of the array and the minimum voltage value of one of the cells of the array.

As described, block diagram 70 of FIG. 3 depicts one instance of a bar-delta filter employed by BECM 33 for modeling one array of traction battery 24. BECM 33 employs multiple instances of the bar-delta filter to model corresponding arrays of traction battery 24.

Referring now to FIG. 4, with continual reference to FIGS. 1, 2, and 3, a block diagram 140 of a plurality of bar-delta filters 142a, 142n implemented by BECM 33 for modeling corresponding arrays 144a, 114n of traction battery 24 is shown. (Of course, although only two pairs of bar-delta filters and arrays are shown, there could be any number of additional pairs of bar-delta filters and arrays). As described above, arrays 144a, 144n are modeled using corresponding bar-delta filters 142a, 142n. In turn, BECM 33 may generate a SOC value, a SOH value, and a SOP value for array 144a via the use of bar-delta filter 142a and may generate a SOC value, a SOH value, and a SOP value for array 144n via the use of bar-delta filter 142n.

BECM 33 includes a battery pack computation routine 146. Battery pack computation routine 146 is configured to generate a SOC value of traction battery 24 based at least in part on the SOC values of arrays 144a, 144b, a SOH value of traction battery 24 based on at least in part on the SOH values of arrays 144a, 144b, and a SOP value of traction battery 24 based at least in part on the SOP values of arrays 144a, 144b. In this way, age differences between arrays 144a, 144b are considered in generating the SOC, SOH, and SOP of traction battery 24. Further, in controlling the operation of vehicle 12 and/or traction battery 24 based on the SOC, SOH, and/or SOP of the traction battery, the age differences between the arrays are considered in such control.

As described, embodiments of the present invention propose creating multiple instances of a bar-delta filter. Each instance of the bar-delta filter models a group of battery cells of a traction battery. The group (i.e., an array) can be based on different factors such as similar temperature profiles, battery pack location in terms of measurement hardware or battery pack design, i.e., the battery cells are physically connected together forming an array. Using as an example a traction battery having ten arrays, the proposed scheme involves ten bar-delta filters. Each bar-delta filter models an array, and the array has its cell state estimation performed just like as if it was a separate battery pack, i.e., each bar-delta filter has a representative average cell in the bar portion of the filter, and the individual cells' variation from the average cell is estimated by the delta portion of the filter. (Block diagram 140 in FIG. 4 shows the array-based bar-delta for j logical cells and N arrays.) In this array-based state estimator configuration, each cell estimate from each of the bar-delta filters is combined to create battery pack-level SOC, SOH, and SOP values.

As set forth, providing a bar-delta filter for each traction battery array increases estimation accuracy since the average model is modeled after a smaller set of the traction battery instead of the entire traction battery. Temperature related parameters will be initialized more accurately, and the algorithm will deal with age-dependent parameters, such as capacity and cell internal resistance, based on more representative state-of-health information. This is opportunistic in the presence of mixed arrays that may become prevalent due to array serviceability.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A system comprising:
a single traction battery pack including a plurality of arrays of battery cells disposed within an enclosure of the traction battery pack and electrically connected to one another within the enclosure of the traction battery pack, each array of the traction battery pack including a group of the battery cells with a first group of the battery cells being arranged in a first array of the traction battery pack and a second group of the battery cells being arranged in a second array of the traction battery pack, the traction battery pack being connected to an electric machine; and
a controller programmed to, while the traction battery pack is connected to the electric machine,
implement first and second bar-delta filters configured to respectively generate output indicative of a state-of-charge (SOC) of the first and second arrays from models of the first and second arrays, and
charge and/or discharge the traction battery pack according to the SOC of the first and second arrays.

2. The system of claim 1 wherein:
the first and second bar-delta filters are further configured to respectively generate output indicative of a state-of-health (SOH) of the first and second arrays from models of the first and second arrays; and
the controller is programmed to charge and/or discharge the traction battery pack according to the SOC and the SOH of the first and second arrays.

3. The system of claim 1 wherein:
the first and second bar-delta filters are further configured to respectively generate output indicative of a state-ofpower (SOP) of the first and second arrays from models of the first and second arrays; and
the controller is programmed to charge and/or discharge the traction battery pack according to the SOC and the SOP of the first and second arrays.

4. The system of claim 1 wherein:
the first and second bar-delta filters are further configured to respectively generate output indicative of a state-of-health (SOH) of the first and second arrays from models of the first and second arrays;
the first and second bar-delta filters are further configured to respectively generate output indicative of a state-of-power (SOP) of the first and second arrays from models of the first and second arrays; and
the controller is programmed to charge and/or discharge the traction battery pack according to the SOC, the SOH, and the SOP of the first and second arrays.

5. The system of claim 1 wherein:
a third group of the battery cells are arranged in a third array of the traction battery pack; and
the controller is further programmed to, while the traction battery pack is connected to the electric machine,
implement a third bar-delta filter configured to generate output indicative of a SOC of the third array from a model of the third array, and
charge and/or discharge the traction battery pack according to the SOC of the first, second, and third arrays.

6. The system of claim 1 wherein:
the output indicative of the SOC of the first array is based in part on a comparison of a measured average voltage of the battery cells of the first array and an estimated average voltage of the battery cells from the model of the first array.

7. The system of claim 6 wherein:
the output indicative of the SOC of the first array is further based in part on a comparison of a measured voltage of one of the battery cells of the first array and an estimated voltage of the one of the battery cells from the model of the first array.

8. The system of claim 7 wherein:
responsive to a first difference between the measured average voltage of the battery cells of the first array and the estimated average voltage of the battery cells from the model of the first array, parameters of a bar filter portion of the first bar-delta filter are updated according to the first difference; and
responsive to a second difference between the measured voltage of one of the battery cells of the first array and the estimated voltage of the one of the battery cells from the model of the first array, parameters of a delta filter portion of the first bar-delta filter are updated according to the second difference.

9. The system of claim 8 wherein:
the estimated voltage of the one of the battery cells from the model of the first array depends on output of the bar filter portion of the first bar-delta filter.

10. The system of claim 1 wherein:
the first array and the second array are differently aged arrays.

* * * * *